United States Patent
Tosato et al.

(10) Patent No.: US 12,375,148 B2
(45) Date of Patent: Jul. 29, 2025

(54) SIGNALLING PORT INFORMATION

(71) Applicant: Nokia Technologies Oy, Espoo (FI)

(72) Inventors: Filippo Tosato, Massy (FR); Rana Ahmed Salem, Stuttgart (DE); Salah Hajri, Nozay (FR); Hao Liu, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 145 days.

(21) Appl. No.: 18/249,931

(22) PCT Filed: Oct. 23, 2020

(86) PCT No.: PCT/CN2020/123376
§ 371 (c)(1),
(2) Date: Apr. 20, 2023

(87) PCT Pub. No.: WO2022/082765
PCT Pub. Date: Apr. 28, 2022

(65) Prior Publication Data
US 2023/0412225 A1    Dec. 21, 2023

(51) Int. Cl.
*H04B 7/06*    (2006.01)
*H04L 25/02*    (2006.01)

(52) U.S. Cl.
CPC ......... *H04B 7/0626* (2013.01); *H04B 7/0639* (2013.01); *H04B 7/065* (2013.01); *H04L 25/0204* (2013.01)

(58) Field of Classification Search
CPC .... H04B 7/0626; H04B 7/0639; H04B 7/065; H04L 25/0204
See application file for complete search history.

(56) References Cited

U.S. PATENT DOCUMENTS

| 10,798,588 B2 | 10/2020 | Yu et al. |
| 2010/0008406 A1 | 1/2010 | Sawal et al. |

(Continued)

FOREIGN PATENT DOCUMENTS

| CN | 107251451 A | 10/2017 |
| CN | 109478909 A | 3/2019 |

(Continued)

OTHER PUBLICATIONS

Office Action received for corresponding Japanese Patent Application No. 2023-524576, dated May 27, 2024, 3 pages of Office Action and 8 pages of summary and translation available.

(Continued)

*Primary Examiner* — David B Lugo
(74) *Attorney, Agent, or Firm* — Nokia Technologies Oy

(57) ABSTRACT

Methods and apparatuses for multi-channel communications are disclosed. A method provides precoding, based on sounding reference signal received from a communication device, reference signal ports in spatial and frequency domain by determining pairs of spatial and frequency domain components where the frequency domain components are arranged in clusters comprising one or more frequency domain components, and pairing of at least one of the spatial domain components with at least two clusters of frequency domain components is enabled; sending information of the precoding to the other communication device; and combining the precoding with a report of precoding received in response from the other communication device. Another method provides sending of the sounding reference signal; receiving, the information of the precoding; performing port selection operation based on the clustered information of frequency domain components; and preparing and sending the report based on the selection operation.

19 Claims, 8 Drawing Sheets

(56) References Cited

U.S. PATENT DOCUMENTS

| | | | |
|---|---|---|---|
| 2019/0182697 | A1 | 6/2019 | Zhang et al. |
| 2021/0314122 | A1* | 10/2021 | Jin .................... H04L 5/005 |
| 2022/0006500 | A1* | 1/2022 | Wei .................... H04W 28/06 |
| 2022/0182122 | A1* | 6/2022 | Ren .................... H04B 7/0626 |
| 2023/0131045 | A1* | 4/2023 | Huang ............... H04L 5/0023 |
| | | | 375/267 |
| 2023/0261707 | A1* | 8/2023 | Wernersson ......... H04B 7/0478 |
| | | | 370/267 |

FOREIGN PATENT DOCUMENTS

| | | |
|---|---|---|
| CN | 110050424 A | 7/2019 |
| CN | 110447178 A | 11/2019 |
| CN | 111630802 A | 9/2020 |
| EP | 2479918 A1 | 7/2012 |
| EP | 3629490 A1 | 4/2020 |
| JP | 2016-534615 A | 11/2016 |
| WO | 2015/023227 A1 | 2/2015 |
| WO | 2020/182269 A1 | 9/2020 |
| WO | 2022/027646 A1 | 2/2022 |
| WO | 2022/077482 A1 | 4/2022 |

OTHER PUBLICATIONS

"CSI enhancements for MTRP and FR1 FDD with partial reciprocity", 3GPP TSG RAN WG1 Meeting #102-e, R1-2005689, Agenda Item: 8.1.4, CATT, Aug. 17-28, 2020, 8 pages.

"Enhancement on CSI measurement and reporting", GPP TSG RAN WG1 Meeting #103-e, R1-2008909, Agenda item: 8.1.4, Nokia, Oct. 26-Nov. 13, 2020, 21 pages.

Office Action received for corresponding Korean Patent Application No. 10-2023-7017071, dated Aug. 16, 2024, 5 pages of Office Action and 5 pages of translation available.

Extended European Search Report received for corresponding European Patent Application No. 20958347.5, dated Jul. 11, 2024, 12 pages.

"CSI enhancements: MTRP and FR1 Fdd reciprocity", 3GPP TSG RAN WG1 #102-e, R1-2006796, Agenda item: 8.1.4, Qualcomm Incorporated, Aug. 17-28, 2020, pp. 1-11.

"CSI enhancements for Multi-TRP and FR1 FDD reciprocity", 3GPP TSG RAN WG1 #102-e, R1-2005460, Agenda item: 8.1.4, ZTE, Aug. 17-28, 2020, pp. 1-8.

Office action received for corresponding Bangladesh Patent Application No. 317/2021, dated Oct. 27, 2024, 1 page.

Office action received for corresponding Japanese Patent Application No. 2023-524576, dated Jan. 14, 2025, 2 pages of office action and 2 pages of summary/translation available.

"New WID: Further enhancements on MIMO for NR", 3GPP TSG RAN Meeting #86, RP-193133, Agenda: 9.1.1, Samsung, Dec. 9-12, 2019, 5 pages.

"3rd Generation Partnership Project; Technical Specification Group Radio Access Network; NR; Physical layer procedures for data (Release 16)", 3GPP TS 38.214, V16.0.0, Dec. 2019, pp. 1-148.

"Enhancement on CSI measurement and reporting", 3GPP TSG RAN WG1 Meeting #102-e, R1-2006849, Agenda: 8.1.4, Nokia, Aug. 17-29, 2020, 19 pages.

U.S. Appl. No. 63/011,674, "Reciprocity-based Port Selection Codebook Enhancement based on Port Specific-Frequency-Domain Bases", filed Apr. 17, 2020, pp. 1-31.

"Technical Categorization for CSI enhancements MTRP and FR1 FDD reciprocity", 3GPP TSG RAN WG1 Meeting #102-e, R1-2007268, Agenda: 8.1.4, Huawei, Aug. 17-28, 2020, 17 pages.

"Discussion Summary for CSI enhancements MTRP and FR1 FDD reciprocity", 3GPP TSG RAN WG1 Meeting #102-e, R1-2006973, Agenda: 8.1.4, Huawei, Aug. 17-28, 2020, 35 pages.

"3rd Generation Partnership Project; Technical Specification Group Radio Access Network; NR; Physical layer procedures for data (Release 16)", 3GPP TS 38.214, V16.3.0, Sep. 2020, pp. 1-166.

International Search Report and Written Opinion received for corresponding Patent Cooperation Treaty Application No. PCT/CN2020/123376, dated Jul. 14, 2021, 10 pages.

Office action received for corresponding Chinese Patent Application No. 202111235711.3, dated Oct. 10, 2022, 5 pages of office action and no page of translation available.

Office action received for corresponding Argentina Patent Application No. 20210102873, dated Jan. 30, 2025, 5 pages of office action and no page of translation available.

\* cited by examiner

SIGNALLING PORT INFORMATION

RELATED APPLICATION

This application was originally filed as a Patent Cooperation Treaty Application No. PCT/CN2020/123376 filed on Oct. 23, 2020, which is hereby incorporated in its entirety.

FIELD

The present disclosure relates to methods, apparatuses and computer program products for signalling port information between communication devices.

BACKGROUND

Communication sessions can be established between two or more communication devices such as user or terminal devices, base stations/access points and/or other nodes. Communication session may be provided, for example, by means of a communication network and one or more compatible communication devices. A communication device at a network side provides an access point to the system and is provided with an appropriate signal receiving and transmitting apparatus for enabling communications, for example enabling other devices to access the communication system. Communication sessions may comprise, for example, communication of data for carrying communications such as voice, video, electronic mail (email), text message, multimedia and/or content data and so on. Non-limiting examples of services provided comprise two-way or multi-way calls, data communication, multimedia services and access to a data network system, such as the Internet.

In a mobile or wireless communication system at least a part of a communication session between at least two devices occurs over a wireless or radio link. Examples of wireless systems comprise public land mobile networks (PLMN), satellite-based communication systems and different wireless local networks, for example wireless local area networks (WLAN). A user can access the wider communication system by means of an appropriate communication device or terminal. A communication device of a user may be referred to as user equipment (UE) or user device.

A communication device is provided with an appropriate signal receiving and transmitting apparatus for enabling communications, for example enabling access to a communication network or communications directly with other users. A communication device of a user may access a carrier provided by a station at a radio access network, for example a base station, and transmit and/or receive communications on the carrier. A feature of the modern systems is the capability of multipath operation. A communication device may communicate via multiple paths. Multipath communication may be provide by means of an arrangement known as multiple input/multiple output (MIMO).

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called fifth generation (5G) or New Radio (NR) networks. 5G is being standardized by the 3rd Generation Partnership Project (3GPP). The successive versions of the standard are known as Releases (Rel). In a 3GPP 5G NR standardisation work is ongoing to further enhance MIMO channel state information (CSI) feedback by exploiting partial uplink/downlink (UL/DL) reciprocity of certain channel statistics.

SUMMARY

In accordance with an aspect there is provided a method for multi-channel communications, the method comprising: precoding, based on sounding reference signal received from a communication device, reference signal ports in spatial and frequency domain by determining pairs of spatial and frequency domain components where the frequency domain components are arranged in clusters comprising one or more frequency domain components, and pairing of at least one of the spatial domain components with at least two clusters of frequency domain components is enabled; sending information of the precoding to the other communication device; and combining the precoding with a report of precoding received in response from the other communication device.

In accordance with an aspect there is provided a method for multichannel communications, the method comprising: sending a sounding reference signal to a communication device; receiving, in response from the communication device, information of precoding comprising information of reference signal ports in spatial and frequency domain defined by pairs of spatial and frequency domain components where the frequency domain components are arranged in clusters comprising one or more frequency domain components and pairing of at least one of the spatial domain components with at least two clusters of frequency domain components is enabled; performing port selection operation based on the clustered information of frequency domain components; and preparing and sending a report based on the selection operation.

In accordance with an aspect there is provided an apparatus comprising at least one processor and at least one memory including a computer program code, the at least one memory and computer program code configured to, with the at least one processor, cause the apparatus at least to: perform precoding, based on sounding reference signal received from a communication device, reference signal ports in spatial and frequency domain by determining pairs of spatial and frequency domain components where the frequency domain components are arranged in clusters comprising one or more frequency domain components and pairing of at least one of the spatial domain components with at least two clusters of frequency domain components is enabled; send information of the precoding to the other communication device; and combine the precoding with a report of precoding received in response from the other communication device.

In accordance with an aspect there is provided an apparatus comprising at least one processor and at least one memory including a computer program code, the at least one memory and computer program code configured to, with the at least one processor, cause the apparatus at least to: send a sounding reference signal to a communication device; receive, from the communication device, information of precoding comprising information of reference signal ports in spatial and frequency domain defined by pairs of spatial and frequency domain components where the frequency domain components are arranged in clusters comprising one or more frequency domain components and pairing of at least one of the spatial domain components with at least two clusters of frequency domain components is enabled; perform port selection operation based on the clustered information of frequency domain components; and prepare and send a report based on the selection operation.

In accordance with a more detailed aspect the report received from the selecting communication device comprises a precoder matrix indication. The combining comprises generating a reconstructed precoding for use in communications.

A portion of a frequency domain compression operation can be performed before sending information of the precoding, wherein the communication device receiving the precoding is configured to perform another portion of the frequency domain compression operation. A greater portion of the frequency domain compression operation may be performed at a device performing the precoding than at the device receiving the precoding. A lesser portion of a combined frequency domain compression operation may be performed at a device receiving information of the precoding.

Sending information of the precoding may comprise sending a channel state information reference signal based on the precoding for use in selection of channel state information reference signal ports or precoding pairs associated with the ports. Selection of channel state information reference signal ports or precoding pairs associated with the ports can then be performed. A precoding matrix indicator report may be sent in response, the report being based on channel state information reference signal ports or precoding pairs selected by the communication device receiving the channel state information reference signal.

A communication device can be configured to participate in calculation of frequency domain components from a restricted subset of a Discrete Fourier Transform codebook for pairs of spatial and frequency domain components, and in response to a channel state information report request, report information of a selection of nonzero coefficients from a sequence formed by frequency domain components computed for all spatial-frequency components measured in the reference signal ports and an indicator indicating the spatial-frequency pair and the frequency domain component corresponding to the reported nonzero coefficients.

A restricted subset of Discrete Fourier Transform components may be provided. The subset can comprise a window of contiguous components or a set of non-contiguous components of a Discrete Fourier Transform codebook including at least component 0. The restricted subset of DFT components can be the same or different in size or components for different groups of spatial-frequency pairs.

A partial reciprocity of cluster delays in channels from and to the communication device may be assumed as a basis of the operation.

Size of the clusters may be determined at least in part based on estimated cluster delay uncertainty.

A precoder weight may be computed. The computed precoder weight may be combined with precoder matrix indicator information received from the selecting communication device to reconstruct the precoding.

Means for implementing the herein disclosed operations and functions can also be provided.

A computer software product embodying at least a part of the herein described functions may also be provided. In accordance with an aspect a computer program comprises instructions for performing at least one of the methods described herein.

BRIEF DESCRIPTION OF DRAWINGS

Some aspects will now be described in further detail, by way of example only, with reference to the following examples and accompanying drawings, in which.

DETAILED DESCRIPTION OF EXAMPLES

The following description gives an exemplifying description of some possibilities to practise the invention. Although the specification may refer to "an", "one", or "some" examples or embodiment(s) in several locations of the text, this does not necessarily mean that each reference is made to the same example of embodiment(s), or that a particular feature only applies to a single example or embodiment. Single features of different examples and embodiments may also be combined to provide other embodiments.

Wireless communication systems provide wireless communications to devices connected therein. Typically, an access point such as a base station is provided for enabling the communications. In the following, different scenarios will be described using, as an example of an access architecture, a 3GPP 5G radio access architecture with MIMO capability. However, embodiments are not necessarily limited to such an architecture. Some examples of options for suitable systems are the universal mobile telecommunications system (UMTS) radio access network (UTRAN or E-UTRAN), long term evolution (LTE), LTE-A (LTE advanced), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), cellular internet of things (IoT) RAN and Internet Protocol multimedia subsystems (IMS) or any combination and further development thereof.

Figure 1:
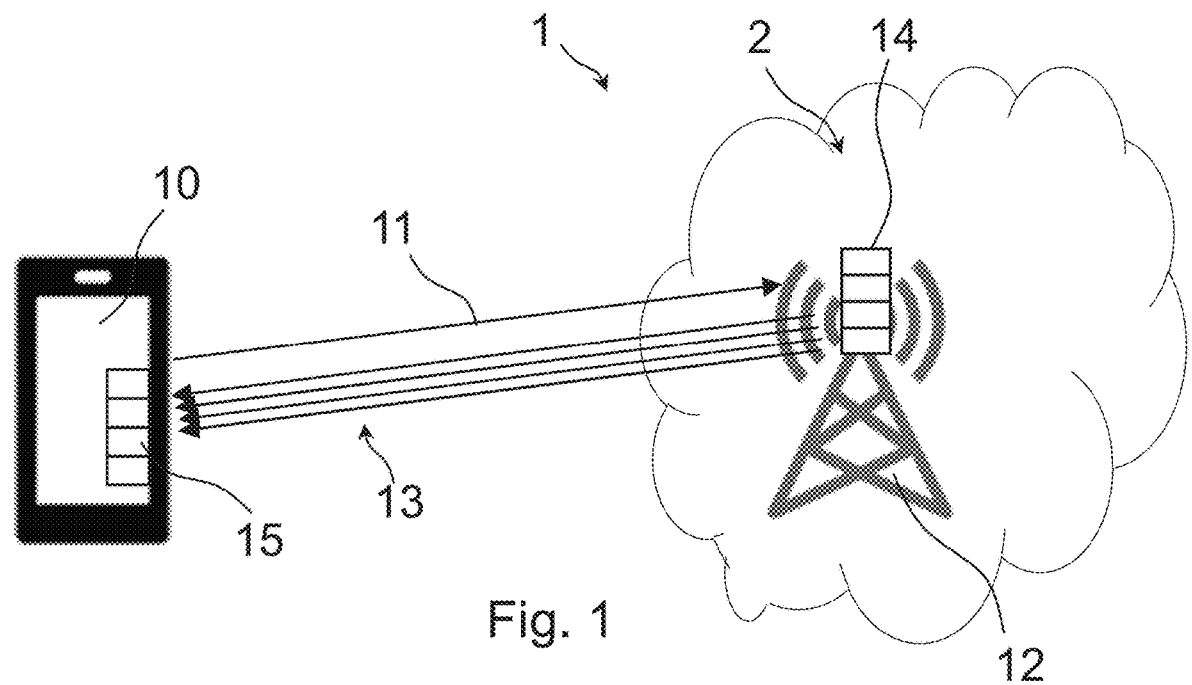
FIG. 1 illustrates an example of a system where the invention can be practiced.

FIG. 1 shows a wireless system 1 comprising a radio access system 2. A radio access system can comprise one or a plurality of access points, or base stations 12. A base station may provide one or more cells. An access point can comprise any node that can transmit/receive radio signals (e.g., a TRP, a 3GPP 5G base station such as gNB, eNB, a user device such as a UE and so forth).

A communications device 10 is located in the service area of the radio access system 2, and the device 10 can thus listen to the access point 12. The communications 11 from the device 10 to the access point 12 is commonly referred to as uplink (UL). The communications 13 from the access point 12 to the device 10 is commonly referred to as downlink (DL). In the example the downlink is shown schematically to comprise up to four beams per polarization in spatial domain (SD).

It is noted that the wider communication system is only shown as cloud 1 and can comprise a number of elements which are not shown for clarity. For example, a 5G based system may be comprised by a terminal or user equipment (UE), a 5G radio access network (5GRAN) or next generation radio access network (NG-RAN), a 5G core network (5GC), one or more application function (AF) and one or more data networks (DN). The 5G-RAN may comprise one or more gNodeB (GNB) or one or more gNodeB (GNB) distributed unit functions connected to one or more gNodeB (GNB) centralized unit functions. The 5GC may also comprise entities such as Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); and Session Management Function (SMF).

The device 10 may be any suitable communications device adapted for wireless communications. A wireless communications device may be provided by any device capable of sending and receiving radio signals. Non-limiting examples comprise a mobile station (MS) (e.g., a mobile device such as a mobile phone or what is known as a 'smart phone'), a computer provided with a wireless interface card or other wireless interface facility (e.g., USB dongle), personal data assistant (PDA) or a tablet provided with wireless communication capabilities, machine-type communications (MTC) devices, Internet of Things (IoT) type communications devices or any combinations of these or the like. The device may be provided as part of another device. The device may receive signals over an air or radio interface via appropriate apparatus for receiving and may transmit signals via appropriate apparatus for transmitting radio signals. The communications can occur via multiple paths. To enable MIMO type communications device 10 and 12 are provided with multiantenna elements. These are schematically denoted by antenna arrays 14 and 15.

Figure 2:
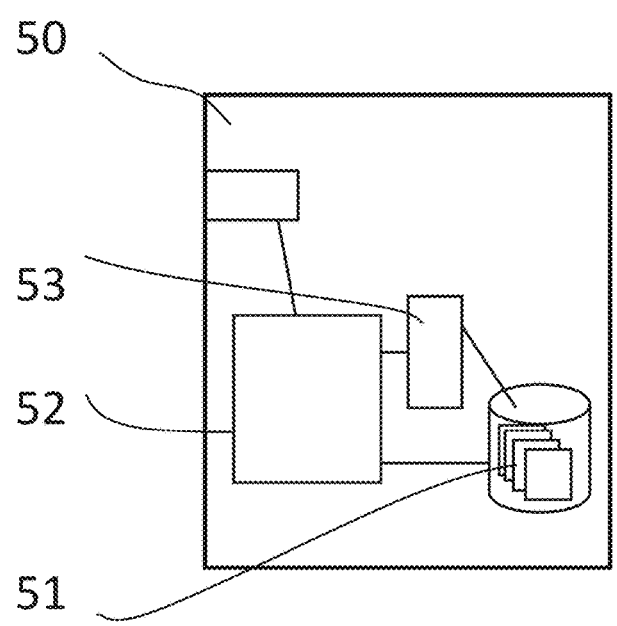
FIG. 2 shows an example of a control apparatus.

A communications device such as the access point 12 or the user device 10 is provided with data processing apparatus comprising at least one processor and at least one memory. FIG. 2 shows an example of a data processing apparatus 50 comprising processor(s) 52, 53 and memory or memories 51. FIG. 2 further shows connections between the elements of the apparatus and an interface for connecting the data processing apparatus to other components of the device.

The at least one memory may comprise at least one ROM and/or at least one RAM. The communications device may comprise other possible components for use in software and hardware aided execution of tasks it is designed to perform, including control of access to and communications with access systems and other communications devices, and implementing the herein described features of positioning of the device. The at least one processor can be coupled to the at least one memory. The at least one processor may be configured to execute an appropriate software code to implement one or more of the following aspects. The software code may be stored in the at least one memory, for example in the at least one ROM.

The following describes certain aspects of measurements, configurations and signaling for multipath, or multibeam wireless transmission related operations using 5G terminology. In Frequency-division Duplex (FDD) based systems, full uplink-downlink (UL-DL) channel reciprocity cannot be assumed due to the duplexing distance between uplink (UL) and downlink (DL) channels. However, a partial channel reciprocity can be assumed based on certain properties such as angles of departure (AoD), angles of arrival (AoA) and delays of the propagation multipath. UL-DL partial reciprocity properties can be taken into consideration in signalling between communicating devices. For example, a gNB can estimate UL sounding reference signals (SRS) to acquire delay related information, such as frequency domain (FD) components, which may be the same as a UE selection made through DL channel state information reference signal (CSI-RS). The gNB can then use the selected FD components to further precode the beamformed CSI-RS resources already containing spatial domain (SD) beams. To convey multiple sets of FD components over the CSI-RS more CSI-RS ports need to be configured. This can result in significant increase in DL CSI-RS resource consumption in proportion to the number of FD components. For example, if each SD beam contains the same number of FD components forming multiple CSI-RS ports, the consumed CSI-RS resources are multiplied with increase of precoded FD components. In order to control total CSI-RS ports and CSI-RS resource overhead, each SD beam may contain different number of FD components according to UL sounding reference signal (SRS) measurement. The gNB may also indicate to the UE the mapping relation of CSI-RS ports with pairs of SD-FD beam.

It has been recognised to be possible to enhance MIMO CSI feedback operation by exploiting partial uplink/downlink (UL/DL) reciprocity of certain channel statistics such as the angle(s) and delay(s). It has already been suggested that enhancement on CSI measurement and reporting can be based on evaluation and, if needed, specifying port selection codebook enhancement (e.g. based on existing 3GPP Rel.15/16 Type II port selection) where information related to angle(s) and delay(s) are estimated at the gNB based on SRS by utilizing DL/UL reciprocity of angle and delay, and the remaining DL CSI is reported by the UE. This has mainly targeted Frequency Range 1 (FR1) frequency-division duplexing (FDD) to achieve better trade-off among UE complexity, performance and reporting overhead. For example, Type II port selection (PS) codebook was enhanced in 3GPP Rel-16 by introducing frequency-domain (FD) compression operation to the 3GPP Rel-15 Type II port selection codebook. Such enhanced Type II PS codebook is described for example in section 5.2.2.2.6 of 3GPP TS 38.214 v16.3.0 of September 2020.

Figure 3:
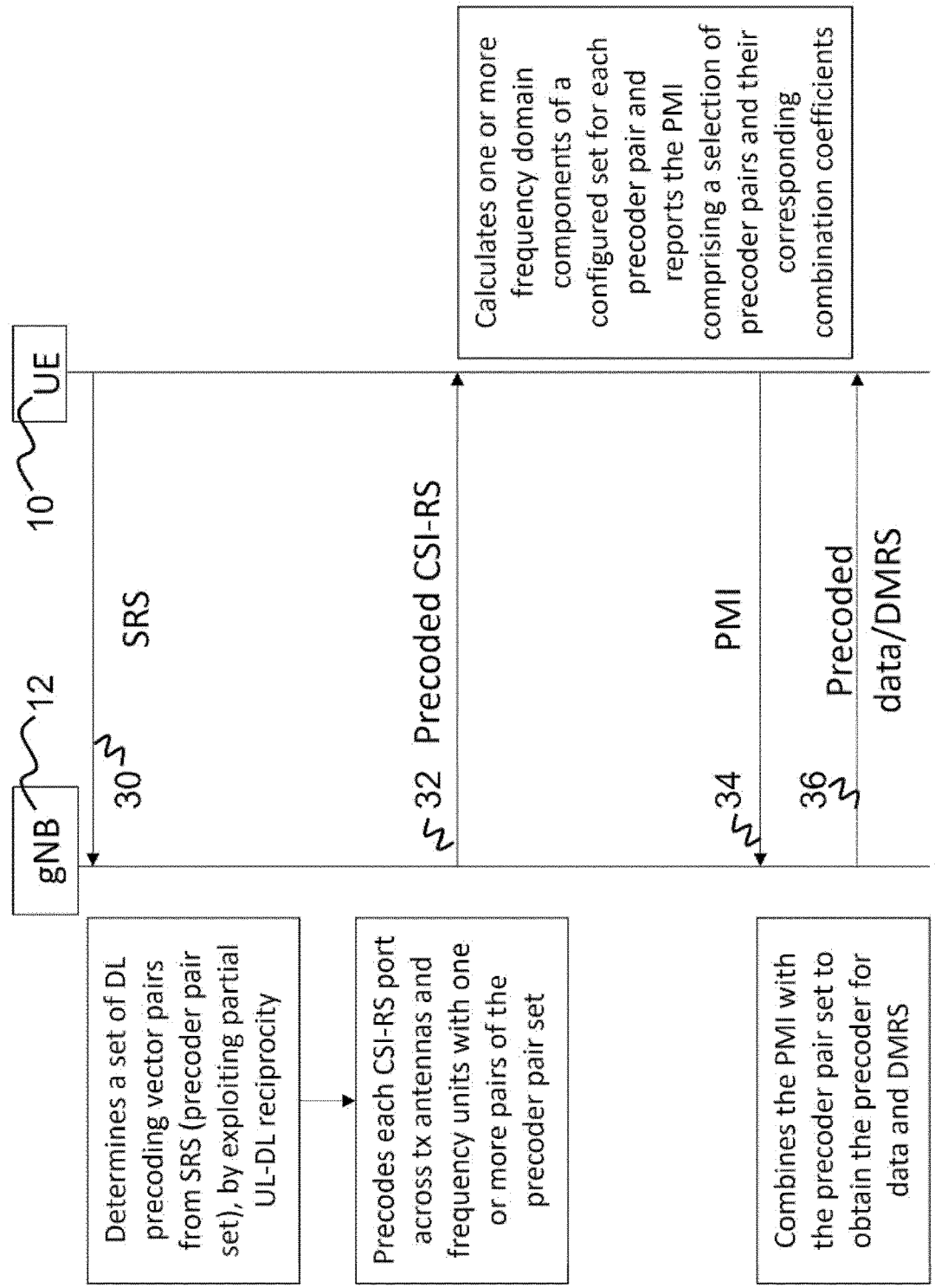
FIG. 3 is a signaling flow chart between two communication devices.

FIG. 3 shows a signalling flowchart in accordance with an example between two communication devices, and more particularly between an UE 10 and gNB 12. The UE sends SRS 30 to the gNB. The gNB can then determine a set of DL precoding vector pairs from the SRS (a precoder pair set), by exploiting partial UL-DL reciprocity. The gNB precodes each CSI-RS port across transmission (tx) antennas and frequency units with one or more pairs of the precoder pair set. The precoded CSI-RS is then sent by message 32 to the UE 10. The UE subsequently calculates one or more frequency domain components of a configured set for each precoder pair and prepares a PMI report. The PMI comprises a selection of precoder pairs and their corresponding combination coefficients. The PMI is signalled by message 34 to the gNB. The gNB combines the PMI with the precoder pair set it prepared earlier to obtain a reconstructed precoder for use for data and DMRS communications 36.

Figure 4:
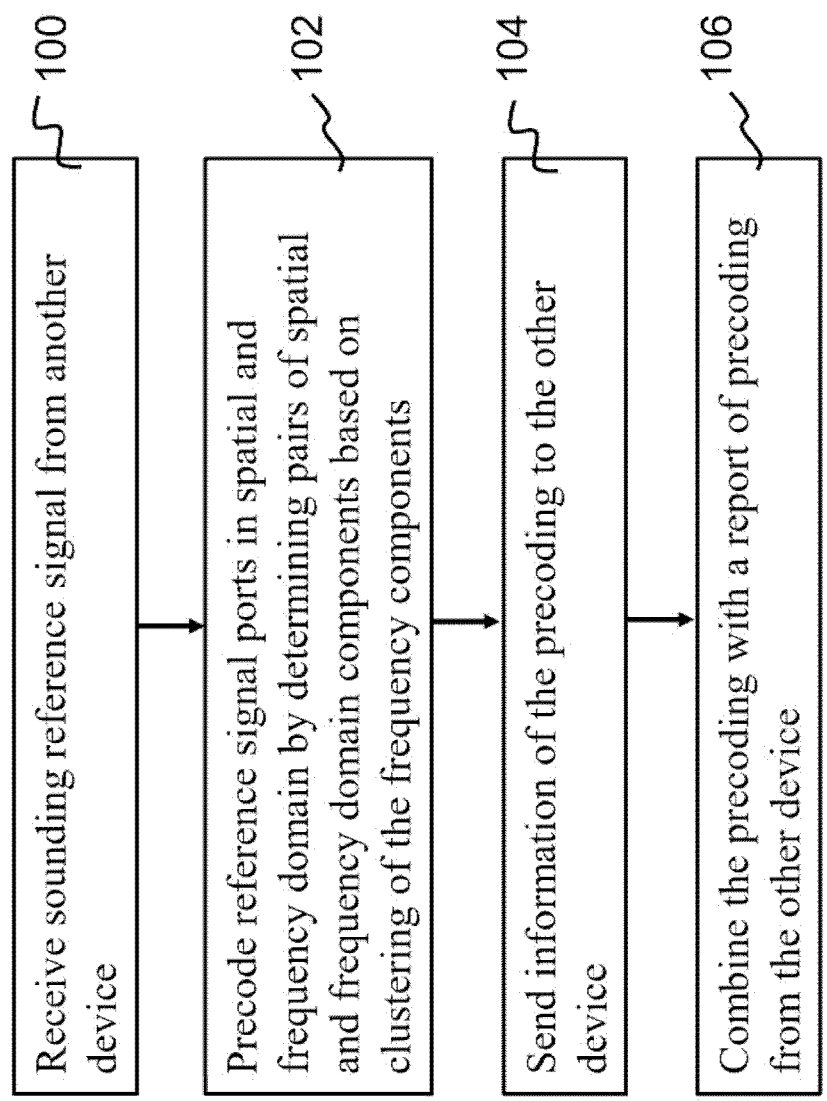
FIGS. 4 and 5 are flowcharts according to certain examples.

FIG. 4 shows a flowchart of an example for operation at a device provided in an access network, for example the access point 12 of FIG. 1, for providing more efficient use of the resources for signalling information relating to reference signal ports information for multichannel communications. In the method the device receives at 100 sounding reference signal received from another communication device. The device can then perform precoding of reference signal ports in spatial and frequency domain at 102 by determining pairs of spatial and frequency domain components base on clustering of the frequency components. The clustering comprises arranging the frequency domain components in clusters comprising one or more frequency domain components and such that pairing of at least one of the spatial domain components with a at least two clusters of frequency domain components is enabled. Information of the precoding can be signalled at 104 to the other communication device and used later at 106 to prepare a combination of the precoding and a port selection report received from the other device.

The other device can use the precoding information signalled thereto in selection of ports as a part of CSI reporting in a reciprocity-based port selection operation. The combination provides a reconstructed precoding that can be used for data transmission to the other device. More detailed examples for possible ways for use of the clustered precoding are given in the following.

Figure 5:
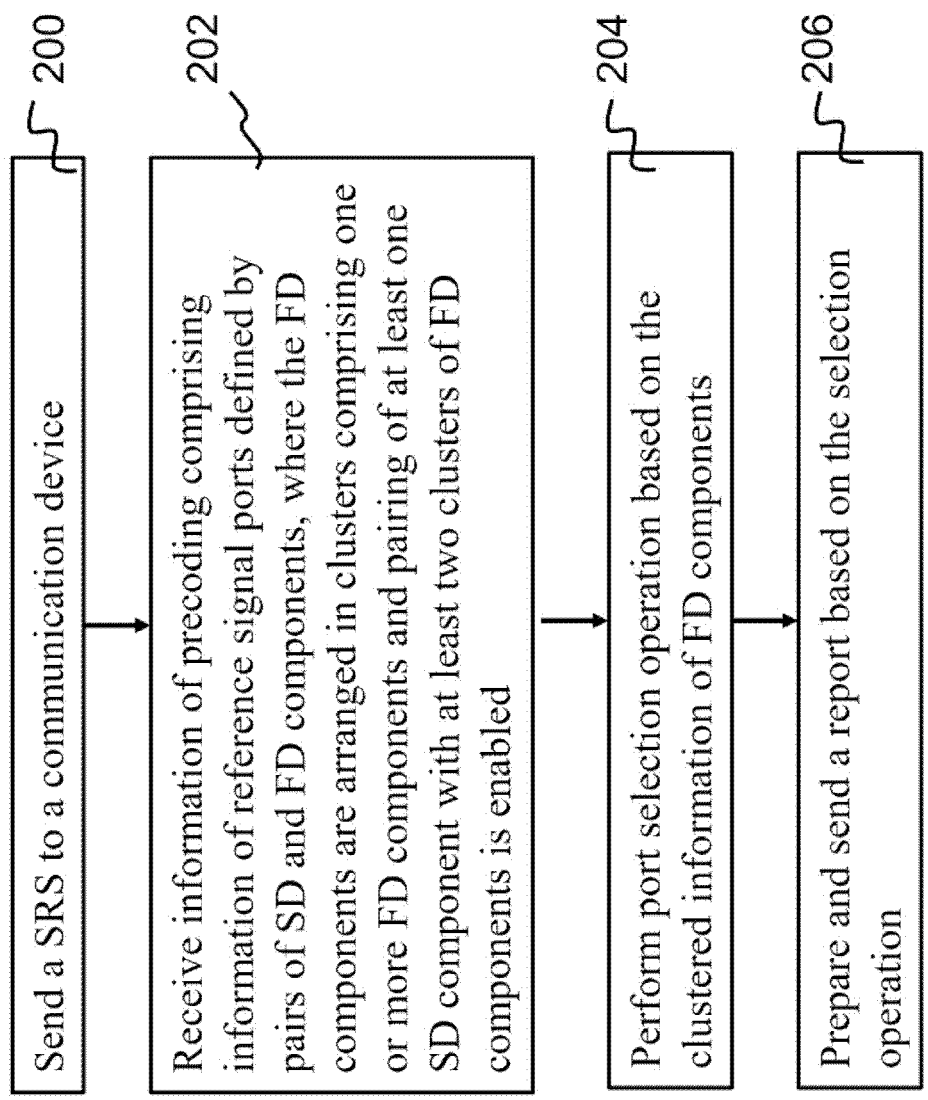

FIG. 5 shows a flowchart of an example for operation at a device receiving the information of the precoding, for example the device 10 of FIG. 1. The device sends at 200 a sounding reference signal to a communication device from which it may then receive the precoding information. In response to sending of the sounding reference signal the device can then receive at 202, from the communication device, information of precoding comprising information of reference signal ports in spatial and frequency domain defined by pairs of spatial and clustered frequency domain components. The frequency domain components are arranged in clusters comprising one or more frequency domain components and such that it is possible for at least one of the spatial domain components to be paired with at least two clusters of frequency domain components. Port selection operation is then be performed at 204 based on the clustered information of frequency domain components. After the selection, a report can be signalled at 206 based on the selection operation. Examples for calculation and measurements for preparing the report and use of the report at the other device are given below.

The following explains in more detail, by way of examples, an enhanced codebook structure for signalling port selection channel state information (PS CSI). In a particular example, an enhancement can be achieved in the context of frequency domain (FD) compression operations. Compression operations can be moved, at least partially or in most part, from the UE to the gNB. The enhancement is based on assumption of partial reciprocity of cluster delays in the UL and DL channels and flexibility in use of frequency domain components.

According to an example a split FD compression operation is provided where some FD component calculations are retained at the UE 10 while some calculations are performed at the gNB 12, instead of an operation where all calculations would be carried out at the UE or at the gNB. For example, the current port selection codebook specified in 3GPP Rel-16 defines that all these calculations are performed at the UE. In accordance with a possibility the gNB perform a greater portion of the computations. The herein described flexible solution presents certain advantage as it allows to reduce the number of spatial-domain (SD-FD) pairs used by the gNB to precode the CSI-RS ports, and hence the reference signalling overhead may be reduced. Accuracy of the precoder matrix reconstructed from the PMI reported by the UE and the gNB own reciprocity-based calculations may also be improved. This is because the UE can be configured to calculate one or more Discrete Fourier Transform (DFT) components within a window of uncertainty for each pair of SD-FD component used to precode the CSI-RS ports. The UE can then report FD components to the gNB the gNB already knows based on UL SRS, and the gNB can use this to provide more accurate estimation.

Instead of a report of only one FD component per precoded SD-FD pair, the gNB can configure the UE to calculate several FD components within a window corresponding to the identified cluster of FD components. The UE can then select which coefficients to report within the cluster.

A CSI reporting mechanism can be configured to operate such that a gNB precodes CSI-RS ports both in the spatial and frequency domain by pairs of spatial-frequency domain components where each spatial domain component is paired with one or more clusters of frequency domain components. A cluster can comprise one or more frequency domain component components.

One frequency domain component of a cluster comprising more than one frequency domain components can be chosen by the gNB to precode the CSI-RS port together with a spatial domain component. This may be the first frequency domain component of the cluster. The UE can be configured to calculate, for example, the first three frequency domain components for that CSI-RS port. To illustrate, assuming there are $N\_3=13$ frequency units, and a cluster for beam 0 consists of DFT component 6, 7, 8 (there are 13 components in total), the gNB can precode a CSI-RS port with the pair (beam 0, FD component 6) and configure the UE to calculate FD component 0, 1, 2. This is equivalent to the gNB using three CSI-RS ports precoded by the pairs (beam 0, FD comp. 6), (beam 0, FD comp. 7), (beam 0, FD comp. 8) and the UE being configured to calculate only FD component 0. Because of the properties of the DFT, the gNB may also use a different FD component (e.g. x) for that cluster, even outside the cluster. In such case the UE is configured to calculate FD components x1, x2, x3 such that $(x+[x1, x2, x3])$ mod $N\_3=[6, 7, 8]$.

The size of the cluster can be configured based on the window of uncertainty. The clusters can be used flexibly. Different clusters may have the same or different number of FD components. Each SD beam may be paired with one or more clusters. Different SD beams may have same or different number of clusters. The concept of "clustering" of frequency domain (FD) components can be understood to refer to a cluster that may appear, for example, as a restriction of the FD codebook that is configured through a window of a given length.

A cluster may comprise one or multiple neighbouring FD components selected by gNB, while only the first FD component within the cluster is precoded over a CSI-RS port for a SD beam.

The UE can be configured to calculate frequency domain components from a restricted subset of a Discrete Fourier Transform (DFT) codebook for each spatial-frequency pair. A restriction of the FD components (Wf) that the UE has to calculate may be provided. The UE then selects which combination coefficients (i.e., FD calculations) to report. The UE can report the value of these coefficients and their position, for example in a bitmap of size $P \times M^{(DL)}$ where P is the number of SD-FD pairs and $M^{(DL)}$ is the size of the FD subset. The UE may not need to report the Wf if the size of this bitmap is small enough if $M^{(DL)}$ is small.

The configuration can be provided, e.g., by Radio Resource Control (RRC) configuration, semi-static configuration such as Medium Access Control-Control Element (MAC-CE) or dynamic signalling such as using Downlink Control Information (DCI) field.

A restricted subset of DFT components can be provided that comprises a window of contiguous components or a set of non-contiguous components of a DFT codebook including at least component 0. This is the first component of the DFT codebook and is preferred because it provides the "average" measurement. The restricted subset of DFT component can be the same or different in size or components for different groups of spatial-frequency pairs.

In response to reception of the CSI-RS port information from the gNB the UE can report back a selection of nonzero coefficients from the sequence formed by the UE-calculated frequency domain components for all spatial-frequency components measured in the CSI-RS ports and an indicator indicating the spatial-frequency pair and UE-calculated frequency domain component corresponding to the reported coefficients.

More detailed examples are explained with reference to FIGS. 6 and 7 and 3GPP Rel-16 eType II codebooks to illustrate further the herein disclosed principles. In accordance with 3GPP 5G standard a $N_t \times N_3$ precoder matrix, for a layer l and for all $N_t$ transmit antennas and $N_3$ Precoding Matrix Indicator (PMI) subbands, can be expressed as $$W^{(l)} = [W(w_0^{(l)} w_1^{(l)} \ldots w_{N_3-1}^{(l)}] = W_1 \tilde{W}_2^{(l)} W_f^{(l)H} \quad (1)$$

where the two DFT-based compression operations in the spatial domain (SD) and frequency domain (FD) are represented by the two bases, $W_1$ and $W_f^{(l)}$, respectively.

A third operation at the UE extracts the layer representation from the $N_r$ receive antennas. This operation is not specified, but typically comprises calculating the strongest $v \leq N_r$ eigenvectors for each PMI subband, such that $W_t^{(l)}$, for $t=0, \ldots, N_3-1$, approximates the l-th strongest $N_t \times 1$ channel eigenvector for subband t.

Enhancing FDD CSI reporting can be based on assumption of reciprocity of cluster delays and angles in FDD operations so that the gNB can estimate a set of dominant SD-FD component pairs and use them to precode the CSI-RS ports. This allows to move some or even most of the SD and FD compression operations from the UE to the gNB.

The gNB can estimate the UL channel by measuring the Sounding Reference Signal (SRS) and determine P SD-FD pairs of vectors. These are denoted below by $(v_{i_p}^{(UL)}, y_{f_p}^{(UL)})$, where $v_{i_p}^{(UL)}$ is an $N_t \times 1$ vector and $y_{f_p}^{(UL)}$ is an $N_3 \times 1$ vector containing the precoding weights in the spatial and frequency domain, respectively. The index $p=0, \ldots, P-1$ is associated to the SD-FD pair. The SD component index is $i_p \in \{0, 1, \ldots, K-1\}$, where K is the number of SD beams. The FD component index is $f_p \in \{0, 1, \ldots, M^{(UL)}-1\}$, where $M^{(UL)}$ denotes the number of FD components. It is noted that, in general, any two pairs may have the same SD or FD component index. Let $$W_i^{(UL)} = [v_{i_0}^{(UL)}, v_{i_1}^{(UL)}, \ldots, v_{i_{P-1}}^{(UL)}] \quad (2)$$

be an $N_t \times P$ matrix whose columns represent the vector of weights used to beamform the CSI-RS ports across the spatial domain, and $$W_f^{(UL)} = [y_{f_0}^{(UL)}, y_{f_1}^{(UL)}, \ldots, y_{f_{P-1}}^{(UL)}]$$

with $$W_{f_p}^{(UL)} = [y_{f_p,0}^{(UL)}, y_{f_p,1}^{(UL)}, \ldots, y_{f_p,N_3-1}^{(UL)}]^T \quad (3)$$

an $N_3 \times P$ matrix whose p-th column, $y_{f_p}^{(UL)}$, contains the weights applied to the p-th CSI-RS port across the $N_3$ frequency units. Some of the vectors in $W_i^{(UL)}$ and $W_f^{(UL)}$ may be repeated, but all the pairs $(v_{i_p}^{(UL)}, y_{f_p}^{(UL)})$, for $p=0, \ldots, P-1$, are nevertheless distinct.

Figure 6:
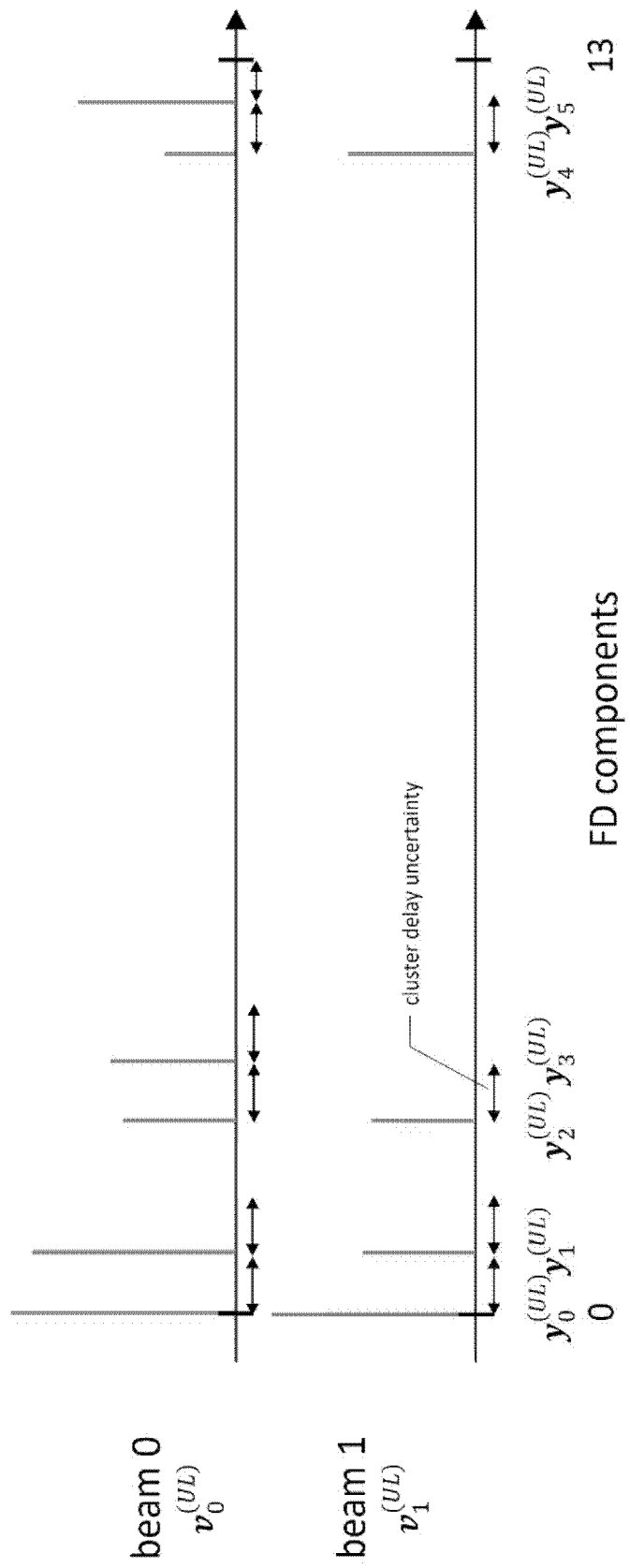
FIG. 6 illustrates an example of SD and FD components determined for two SD beams based on received SRS.

FIG. 6 illustrates an example where decomposition of the UL channel in K=2 spatial beams (beam 0, beam 1) and $M^{(UL)}=6$ FD components. The SD components and FD components can be determined at the gNB based on SRS measurements. The FD components can be drawn from a DFT codebook. A beam representation in the transform domain exposes the dominant cluster delays measured on that beam.

The double headed arrows denote an uncertainty associated with the cluster delay estimation at the gNB. This uncertainty can be caused, e.g., by mismatch in UL-DL delay reciprocity, impairments in the UL channel estimation and aging effects due to the time that lapses between the UL channel estimation from the SRS and the DL channel estimation from CSI-RS.

Besides, applying a DFT vector as precoding weights across the frequency units of a CSI-RS port beamformed by a certain spatial beam corresponds to a circular shift of the beam representation in the transform domain. This is illustrated in the left-hand side of FIG. 7 where examples are given for pairing of SD and FD components for the FIG. 6 example. More particularly, a possible clustered pairing of SD-FD components at the gNB is presented. The clusters are defined by windows 20. The pair selection at the UE is then presented on the righthand table. In this case, the UE is configured to calculate $\hat{M}((DL))=2$ FD components (0 and 1) for each SD-FD pair. Shaded cells correspond to selected SD-FD pairs, for which a nonzero coefficient can be reported.

Figure 7:
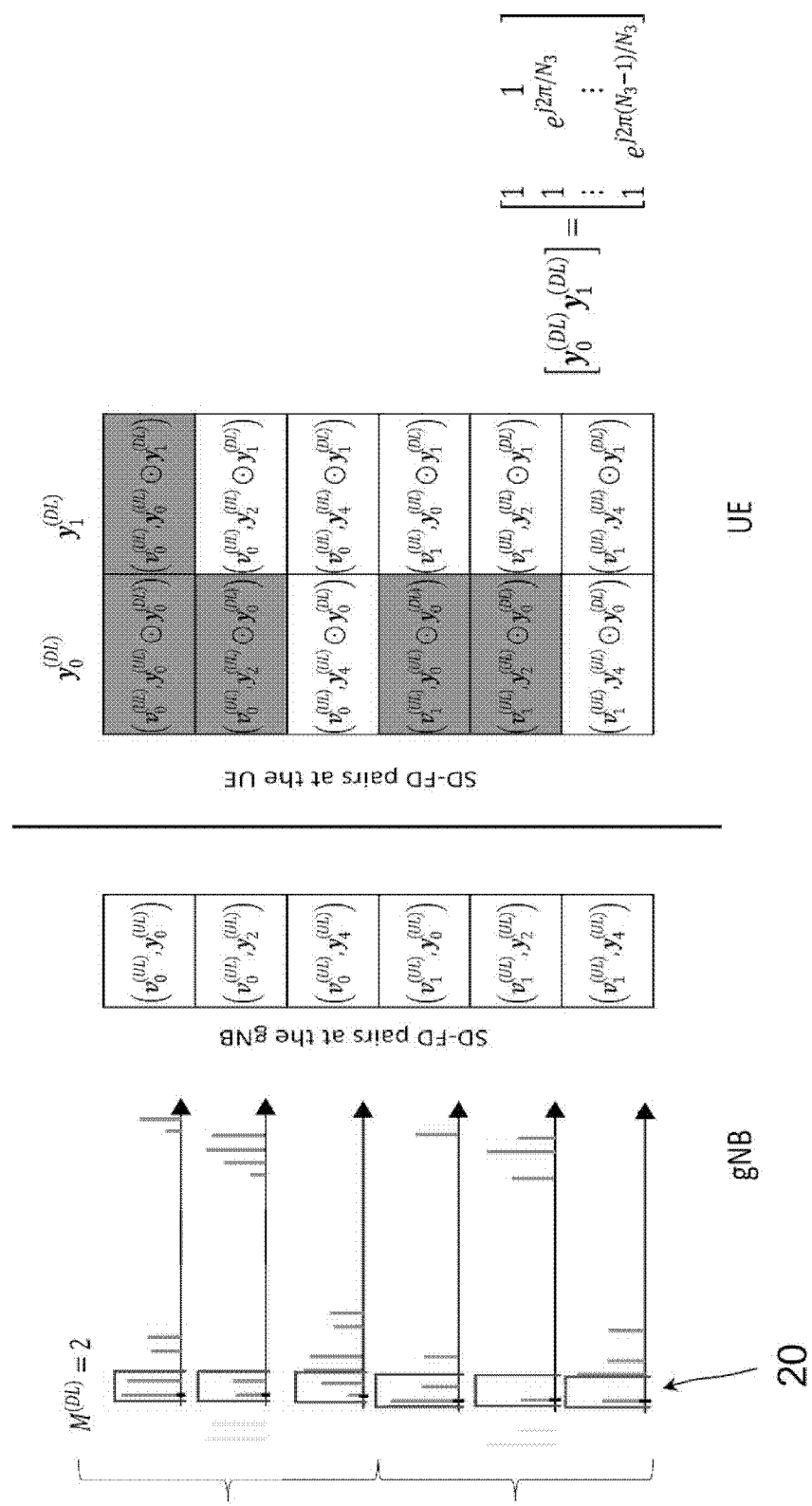
FIG. 7 shows examples for pairings of SD and FD components and port selection based on the pairing.

In FIG. 7 example the gNB forms clusters of FD components based on window 20. It is noted that the lowest row y4 refers to the FD component numbers of FIG. 6 illustrating the FD component estimation by the gNB based on the UL channel measurement. The corresponding estimation at the UE may be different and have a strong component in y5 for beam 1, for example.

The size of the window can be defined taking the uncertainty into account. The gNB can pair each spatial beams with the first representative component of the clusters. The example has 3 clusters for beam 0 and 3 clusters for beam 1. In total, the gNB has selected 6 out of $KM^{(UL)}=12$ possible combinations. For the precoding of CSI-RS ports, each cluster can be moved to FD location 0, by precoding the port with the first FD component of the cluster. It shall be appreciated that a different number of clusters, FD components per cluster and beams can be selected.

It can be assumed, for simplicity, that there is a one-to-one mapping between the P distinct SD-FD component pairs and the $P_{CSI-RS}$ ports, such that $P_{CSI-RS}=P$.

The P CSI-RS sequences used across the $N_{PRB}$ PRBs can be introduced in the Bandwidth Part (BWP) configured for CSI reporting:

$$\{a_0, a_1, \ldots, a_{P_{CSI-RS}-1}\}$$

with $$a_p = [a_{p,0}, a_{p,1}, \ldots, a_{p,N_{PRB}-1}^{SB}]^T \quad (4)$$

Indicate with $t = \lfloor k/N_{PRB}^{SB} \rfloor$ the frequency unit (i.e., Precoding Matrix Indicator (PMI) subband) corresponding to PRB k, where $N_{PRB}^{SB}$ is the number of Physical Resource Blocks (PRBs) in a frequency unit. The signal received in PRB k by a UE equipped with $N_r$ receive antennas, on the CSI-RS ports, $Y_k$, after code demultiplexing if CDM was used, can be written as an $N_r \times P$ matrix, $$Y_k = H_k^H W_1^{(UL)} \text{diag}\left(w_{f,0,t}^{*(UL)}, \ldots, w_{f,P-1,t}^{*(UL)}\right) \text{diag}(a_{0,k}, \ldots, a_{P-1,k}) + N_k = \qquad (5)$$

$$H_k'^H \text{diag}(a_{r,k}) + N_k$$

where $H_k^H$ is the $N_r \times N_t$ DL channel matrix for PRB k, $H'_k{}^H$ is the $N_r \times P$ effective DL channel matrix seen by the UE through the beamformed CSI-RS ports and $N_k$ is the additive noise.

The CSI-RS measurements on PRB k are given by the matrix $$\hat{H}'_k = \text{diag}(c_{r,k}) Y_k^H. \qquad (6)$$

and the $P \times N_r$ matrix of measurements for each SD-FD component pair and receive antenna, on subband t can be obtained, for example, by averaging over the PRBs in that subband $$\hat{H}'_t = [\hat{h}'_{t,0}, \hat{h}'_{t,1}, \ldots, \hat{h}'_{t,N_r-1}] = \Sigma_{k \downarrow k/N_{PRB}^{SB}} = \hat{H}'_k / N_{PRB}^{SB}. \qquad (7)$$

Figure 8:
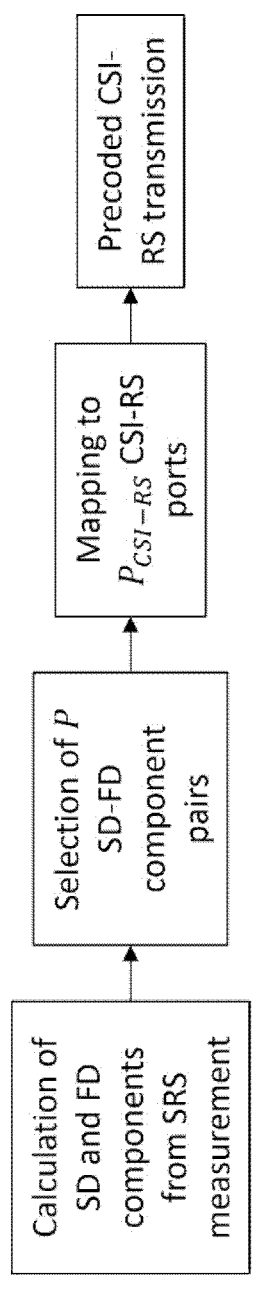
FIGS. 8, 9 and 10 show yet another example.
Figure 9:
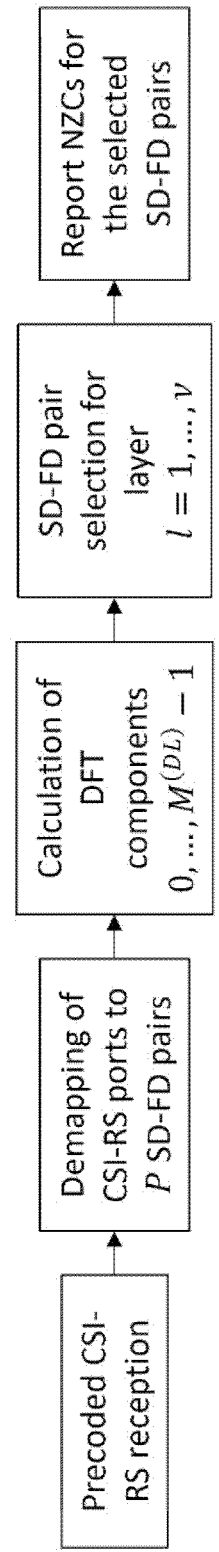
Figure 10:
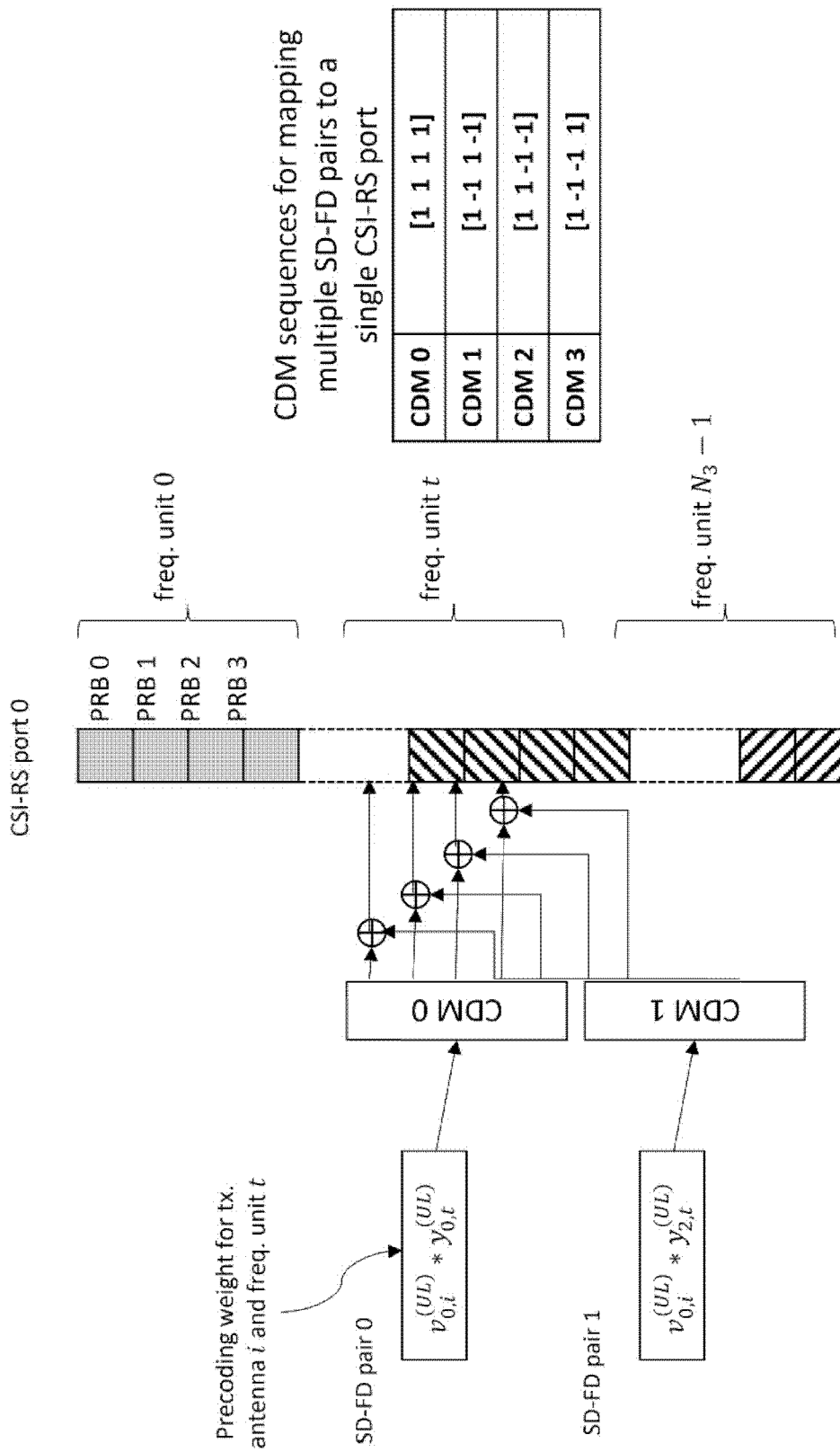

As noted previously, an assumption can be made that the number of SD-FD component pairs, P, equals the number of CSI-RS ports, $P_{CSI-RS}$, such that there is a one-to-one mapping between SD-FD component pairs and ports. However, a many-to-one mapping may also be adopted to reduce the DL reference signal overhead, in which case the above expressions are modified to include the mapping and demapping operation. Examples for many-to-one mapping operations are illustrated in FIGS. 8, 9 and 10 and described in more detail later.

An enhanced port-selection codebook structure can be considered based on equation (1), where the codebook for $W_1^{(DL)}$ is associated to the selection of SD-FD pairs, whereas $W_f^{(DL)} = [y_0^{(DL)}, y_1^{(DL)}, \ldots, y_{M-1}^{(DL)}]$ corresponds to a DFT codebook restricted by the network to the first $M^{(DL)}$ components, where $M^{(DL)}$ can be very small. A special case of interest is for $M^{(DL)} = 1$, such that $$W_f^{(DL)} = y_0^{(DL)} = \begin{bmatrix} 1 \\ 1 \\ \vdots \\ 1 \end{bmatrix}. \qquad (8)$$

In this case, a UE calculates only the FD component 0 and no DFT operation is required to be performed by the UE in the frequency domain. In this case, the PMI reported by the UE is the same for all subbands, as the precoder variations in the frequency domain can be determined at the gNB.

Values of $M^{(DL)}$ larger than 1 are considered in FIG. 7 example. In this case a part of the precoder variations in frequency can be determined at the UE as well as at the gNB. The case of $M^{(DL)} = N_3$ can correspond to 3GPP Rel-16 eType II PS codebook where there are no restrictions on the FD codebook at the UE and FD precoding of the CSI-RS ports at the gNB is not required. In the example of FIG. 7 the SD-FD component pairing at the gNB and pair selection at the UE for $M^{(DL)} = 2$ is shown. Configuring the parameter $M^{(DL)}$ to a value larger than 1 may be beneficial to reduce the number of SD-FD pairs, and hence CSI-RS ports needed. The accuracy of the reported PMI may also be improved by allowing the UE to select the best delay(s) (i.e., FD components) within an uncertainty window of length $M^{(DL)}$, for each FD component identified by the gNB.

When the parameter $M^{(DL)} > 1$ the PMI reported by the UE may be different for different subbands. The UE can contribute to the operation by determining the frequency domain variations of the precoder. The gNB receives these in the PMI report and can then combine the variations with the precoder variations in frequency calculated by the gNB based on the partial reciprocity assumption.

SD-FD pairs can be selected by the UE out of $PM^{(DL)}$ possible pairs, where the effective FD component calculated by the UE for pair $(v_{i_p}^{(UL)}, y_{f_p}^{(UL)})$ is, in general, the combination of UL and DL FD components, $y_{f_p}^{(UL)} \odot y_m^{(DL)}$, for $m = 0, \ldots, M^{(DL)} - 1$. In the case $M^{(DL)} = 1$, $y_{f_p}^{(UL)} \odot y_0^{(DL)} = y_{f_p}^{(UL)}$. The selected SD-FD pairs, symbolised by the shaded cells in FIG. 7, also correspond to the reported nonzero coefficients. In the example the UE selects five dominant or strongest pairs.

In order to determine the linear combination coefficients for each SD-FD pair and receive antenna, the UE can form a $P \times N_3$ matrix, $W'_2{}^{(r)}$, for $r = 0, \ldots, N_r - 1$ $$W'_2{}^{(r)} = [\hat{h}_{0,r}', \hat{h}_{1,r}', \ldots, \hat{h}_{N_a-1,r}'] \qquad (9)$$

and calculate the coefficients by applying (8) to (9). This yields the $P \times 1$ vector (or $P \times M^{(DL)}$ matrix, in general for $M^{(DL)} \geq 1$)

$$\tilde{w}_2^{(r)} = W'_2{}^{(r)} y_0^{(DL)} = \sum_{t=0}^{N_3-1} \hat{h}'_{t,r} \qquad (10)$$

At this stage the UE can determine the strongest spatial layers from linear combinations of the receive antennas. This operation can be performed by applying a single singular value decomposition (SVD) to the $P \times N_r$ matrix, $[\tilde{w}'_2{}^{(0)}, \tilde{w}'_2{}^{(1)}, \ldots, \tilde{w}'_2{}^{(N_r-1)}]$, (or $PM^{(DL)} \times N_r$ matrix) and obtaining the strongest v left eigenvectors:

$$\left[\tilde{w}_2'^{(0)}, \tilde{w}_2'^{(1)}, \ldots, \tilde{w}_2'^{(N_r-1)}\right] \overset{SVD}{\longrightarrow} \left[\tilde{w}_2^{(1)}, \tilde{w}_2^{(2)}, \ldots, \tilde{w}_2^{(v)}\right], v \leq N_r \qquad (11)$$

with $$\tilde{w}_2^{(l)} = \left[c_0^{(l)}, c_1^{(l)}, \ldots, c_{P-1}^{(l)}\right]^T.$$

In 3GPP Rel-16 eType II codebooks (CBs), this layer extraction is typically done per subband, before applying FD compression. However, when FD precoding is applied to the CSI-RS ports, the phase relation between subbands cannot be easily preserved if eigenvectors are extracted before the summation in (10). Eigenvectors are determined in each subband with a phase uncertainty, which can be adjusted, for example, to remove phase jumps between subbands before FD compression. However, when FD precoding is applied at the gNB, these phase adjustments at the UE would change the phase relations between subbands and effectively change the effect of the precoder weights applied in frequency at the gNB.

After the layer processing, the UE can select a subset of strongest nonzero coefficients out of the P coefficients in $\tilde{w}_2^{(1)}$ for layer 1, $\tilde{w}_2^{(2)}$ for layer 2, etc. This selection of nonzero linear combination coefficients can be free within the vector $P \times 1$ of coefficients for layer 1 (or, in general, within a $P \times M^{(DL)}$ matrix of coefficients) and the corresponding bitmap also indicates the selection of SD-FD pairs.

Regarding the presence of restriction in the SD-FD pair selection, in 3GPP Rel-15/16 port selection is constrained to a group of L consecutive ports, with port groups separated by $d \leq L$ ports, and with the same ports used for both polarisations. Conversely, 3GPP Rel-17 allows unconstrained or free selection, with the selection extended to the set of P SD-FD pairs, which can be larger than the number $P_{CSI-RS}$ of ports.

In view of the PMI reconstruction and reciprocity precoder representation it is noted that if $M^{(DL)}=1$ a UE reports only FD component 0 from the selected SD-FD pairs. Let $k_{0,l}, k_{1,l}, \ldots, k_{L-1,l}$ be the indices of the L selected SD-FD pairs for layer l, with $k_{j,l} \in \{0, \ldots, P-1\}$. Let $c_{k_{j,l}}^{(l)}$ be the linear combination coefficient corresponding to SD-FD pair $k_{j,l}$, and $v_{k_{j,l}}^{(DL)}$ the selection vector formed by all-zeros with a one in position $k_{j,l}$. The $P \times N_3$ precoder matrix for layer l, reported by the UE in the PMI can be expressed as $$W^{(l)} = \sum_{j=0}^{L-1} v_{k_{j,l}}^{(DL)} c_{k_{j,l}}^{(l)} y_0^{(DL)H}. \quad (12)$$

The $N_t \times N_3$ reciprocity precoder combining the weights calculated by the gNB and taking the PMI into account, can be expressed as $$W_R^{(l)} = \sum_{j=0}^{L-1} v_{i_{k_{j,l}}}^{(UL)} c_{k_{j,l}}^{(l)} \left( y_{f_{k_{j,l}}}^{(UL)} \odot y_0^{(DL)} \right)^H = \sum_{j=0}^{L-1} c_{k_{j,l}}^{(l)} v_{i_{k_{j,l}}}^{(UL)} y_{f_{k_{j,l}}}^{(UL)H}. \quad (13)$$

In the general case illustrated in FIG. 7, with $M^{(DL)} \geq 1$, let $c_{k_{j,l},m}^{(l)}$ be the linear combination coefficient corresponding to SD-FD pair $k_{j,l}$ and UE-calculated FD component m. The $P \times N_3$ precoder matrix for layer l, reported by means of the PMI can be expressed as $$W^{(l)} = \sum_{j=0}^{L-1} v_{k_{j,l}}^{(DL)} \sum_{m=0}^{M^{(DL)}-1} c_{k_{j,l},m}^{(l)} y_m^{(DL)H}. \quad (14)$$

The $N_t \times N_3$ reciprocity precoder combining the weights calculated by the gNB and taking the PMI into account, can now be expressed in this scenario as $$W_R^{(l)} = \sum_{j=0}^{L-1} v_{i_{k_{j,l}}}^{(UL)} \sum_{m=0}^{M^{(DL)}-1} c_{k_{j,l},m}^{(l)} \left( y_{f_{k_{j,l}}}^{(UL)} \odot y_m^{(DL)} \right)^H. \quad (15)$$

It is noted that although the above examples have been described with reference to a user equipment (UE) and gNB, similar principles can be applied to any devices capable of multibeam communications.

In accordance with a possibility, multiple precoding pairs are mapped in the same CSI-RS ports. This is another possibility of reducing the number of ports that need to be reported. In here it is possible to use code division multiplexing (CDM) code for this multiplexing of pairs to a single port by exploiting the fact that each frequency unit consists of multiple PRBs that are precoded by the same frequency component weight. An example of the many-to-one mapping operation between P SD-FD precoding pairs and $P_{CSI-RS} \leq P$ CSI-RS ports is illustrated in FIG. 8 showing a functional block diagram of the operations performed at the gNB. The reverse one-to-many de-mapping operation takes place at the UE, as illustrated in the functional block diagram of the UE operations in FIG. 9. FIG. 10 shows an example of this many-to-one mapping.

In the example, the bandwidth part (BWP) configured for CSI reporting is divided in $N_3$ frequency units and each frequency unit consists of $N_{PRB}^{SB}=4$ PRBs. The example shows how a length-4 CDM sequence can be used to accommodate two SD-FD pairs in one CSI-RS port, for a generic frequency unit t. The operation is repeated for all frequency units with different frequency component weights. Up to $N_{PRB}^{SB}$ SD-FD pairs may be multiplexed in the same port. It is also noted that the illustration in FIG. 10 does not show other possible operations in the generation of the CSI-RS port sequence such as multiplication of the precoding weights by the CSI-RS sequence, $\alpha_p$, for port p, mapping of the sequence to the resource elements (REs) within the PRBs and possible multiplication by another CDM sequence associated with the mapping of the port sequence to REs. These operations typical procedures in the generation of a CSI-RS transmit sequence and are not affected by the precoding pairs-to-port mapping shown in FIG. 10.

A device for multi-channel communications can comprise means for precoding, based on sounding reference signal received from a communication device, reference signal ports in spatial and frequency domain by determining pairs of spatial and frequency domain components where the frequency domain components are arranged in clusters comprising one or more frequency domain components, and pairing of at least one of the spatial domain components with at least two clusters of frequency domain components is enabled; means for sending information of the precoding to the other communication device; and means for combining the precoding with a report of precoding received in response from the other communication device.

Another device for multi-channel communications can comprise means for sending a sounding reference signal to a communication device; means for receiving, in response from the communication device, information of precoding comprising information of reference signal ports in spatial and frequency domain defined by pairs of spatial and frequency domain components where the frequency domain components are arranged in clusters comprising one or more frequency domain components and pairing of at least one of the spatial domain components with at least two clusters of frequency domain components is enabled; means for performing port selection operation based on the clustered information of frequency domain components; and means for preparing and sending a report based on the selection operation.

It is also noted that while the above describes example embodiments, there are several variations and modifications which may be made to the disclosed solution without departing from the scope of the present invention. Different features from different embodiments may be combined.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively or additionally some embodiments may be implemented using circuitry. The circuitry may be configured to perform one or more of the functions and/or method procedures previously described. That circuitry may be provided in the network entity and/or in the communications device and/or a server and/or a device.

As used in this application, the term "circuitry" may refer to one or more or all of the following:
(a) hardware-only circuit implementations (such as implementations in only analogue and/or digital circuitry);
(b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause the communications device and/or device and/or server and/or network entity to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

It is noted that whilst embodiments have been described in relation to certain architectures, similar principles can be applied to other systems. Therefore, although certain embodiments were described above by way of example with reference to certain exemplifying architectures for wireless networks, technologies standards, and protocols, the herein described features may be applied to any other suitable forms of systems, architectures and devices than those illustrated and described in detail in the above examples. It is also noted that different combinations of different embodiments are possible. It is also noted herein that while the above describes exemplifying embodiments, there are several variations and modifications which may be made to the disclosed solution without departing from the spirit and scope of the present invention.

What is claimed is:

1. A method, comprising:
   sending a sounding reference signal to a communication device;
   receiving, in response from the communication device, information of precoding comprising information of reference signal ports in spatial and frequency domain defined by pairs of spatial and frequency domain components where the frequency domain components are arranged in clusters comprising one or more frequency domain components and the precoding comprises pairing of at least one of the spatial domain components with at least one cluster of frequency domain components;
   performing port selection operation based on the clustered information of frequency domain components;
   performing a frequency domain compression operation after receiving the information of the precoding from the communication device, wherein another frequency domain compression operation has been applied to the received information of the precoding by the communication device; and
   preparing and sending a report based on the selection operation and the frequency domain compression operation.

2. The method according to claim 1, further comprising:
   participating in calculation of frequency domain components from a restricted subset of a Discrete Fourier Transform codebook for pairs of spatial and frequency domain components; and
   signalling information of a selection of nonzero coefficients from a sequence formed by frequency domain components computed for all spatial-frequency components measured in the reference signal ports and an indicator indicating the spatial-frequency pairs corresponding to the reported nonzero coefficients.

3. The method according to claim 2, wherein the information is signaled in response to a channel state information report request.

4. The method according to claim 2, wherein the information further indicates frequency domain components corresponding to the reported non-zero coefficients.

5. The method according to claim 1, further comprising receiving a restricted subset of Discrete Fourier Transform components, wherein the subset comprises a window of contiguous components or a set of non-contiguous components of a Discrete Fourier Transform codebook including at least component 0.

6. An apparatus, comprising:
   at least one processor; and
   at least one memory including a computer program code, the at least one memory and computer program code configured to, with the at least one processor, cause the apparatus at least to:
   perform precoding, based on sounding reference signal received from a communication device, reference signal ports in spatial and frequency domain by determining pairs of spatial and frequency domain components where the frequency domain components are arranged in clusters comprising one or more frequency domain components and the precoding comprises pairing of at least one of the spatial domain components with at least one cluster of frequency domain components, send information of the precoding to the communication device, wherein the communication device is caused to perform a frequency domain compression operation after receiving the information of the precoding, wherein another frequency domain compression operation has been applied to the transmitted information of the precoding by the apparatus; and combine the precoding with a report of precoding received in response from the communication device.

7. The apparatus according to claim 6, wherein the report received from the communication device comprises a precoder matrix indication, wherein the at least one memory and computer program code are configured to, with the at least one processor, cause the apparatus further to generate a reconstructed precoding based on the precoding and the precoder matrix indication for use in communications with the communication device.

8. The apparatus according to claim 6, wherein the at least one memory and computer program code are configured to, with the at least one processor, cause the apparatus further to:

cause the communication device to participate in calculation of frequency domain components from a restricted subset of a Discrete Fourier Transform codebook for pairs of spatial and frequency domain components, and receive from the communication device information of a selection of nonzero coefficients from a sequence formed by frequency domain components computed by the communication device for all spatial-frequency components measured in the reference signal ports and an indicator indicating the spatial-frequency pairs corresponding to the reported nonzero coefficients.

9. The apparatus according to claim 8, wherein the information is received in response to a channel state information report request.

10. The apparatus according to claim 8, wherein the information further indicates frequency domain components corresponding to the reported non-zero coefficients.

11. The apparatus according to claim 6, wherein the at least one memory and computer program code are configured to, with the at least one processor, cause the apparatus further to:

provide a restricted subset of Discrete Fourier Transform components, wherein at least one of: the subset comprises a window of contiguous components or a set of non-contiguous components of a Discrete Fourier Transform codebook including at least component 0, or the restricted subset of DFT components can be the same or different in size or components for different groups of spatial-frequency pairs.

12. The apparatus according to claim 6, wherein the at least one memory and computer program code configured to, with the at least one processor, cause the apparatus further to:

perform a portion of a frequency domain compression operation before sending of the information of the precoding to the communication device, wherein the communication device is configured to perform another portion of the frequency domain compression operation, operate based on assumption of a partial reciprocity of cluster delays in channels from and to the communication device, determine the size of the clusters at least in part based on estimated cluster delay uncertainty, or compute a precoder weight and combining the computed precoder weight with precoder matrix indicator information received from the communication device to reconstruct the precoding.

13. An apparatus, comprising:
at least one processor; and
at least one memory including a computer program code, the at least one memory and computer program code configured to, with the at least one processor, cause the apparatus at least to:

send a sounding reference signal to a communication device, receive, from the communication device, information of precoding comprising information of reference signal ports in spatial and frequency domain defined by pairs of spatial and frequency domain components where the frequency domain components are arranged in clusters comprising one or more frequency domain components and the precoding comprises pairing of at least one of the spatial domain components with at least one cluster of frequency domain components, perform port selection operation based on the clustered information of frequency domain components, performing a frequency domain compression operation after receiving the information of the precoding from the communication device, wherein another frequency domain compression operation has been applied to the received information of the precoding by the communication device, and prepare and send a report based on the selection operation and the frequency domain compression operation.

14. The apparatus according to claim 13, wherein the report comprises a precoder matrix indication for use in generation of a reconstructed precoding by the communication device.

15. The apparatus according to claim 13, wherein the at least one memory and computer program code are configured to, with the at least one processor, cause the apparatus further to:

select channel state information reference signal ports or precoding pairs associated with the ports based on the clustered information of precoding, and prepare and send a precoding matrix indicator or precoding pairs based on the selected channel state information reference signal ports.

16. The apparatus according to claim 13, wherein the at least one memory and computer program code are configured to, with the at least one processor, cause the apparatus further to:

participate in calculation of frequency domain components from a restricted subset of a Discrete Fourier Transform codebook for pairs of spatial and frequency domain components, and signal information of a selection of nonzero coefficients from a sequence formed by frequency domain components computed for all spatial-frequency components measured in the reference signal ports and an indicator indicating the spatial-frequency pairs corresponding to the reported nonzero coefficients.

17. The apparatus according to claim 16, wherein the information is signaled in response to a channel state information report request.

18. The apparatus according to claim 16, wherein the information further indicates frequency domain components corresponding to the reported non-zero coefficients.

19. The apparatus according to claim 13, wherein the at least one memory and computer program code are configured to, with the at least one processor, cause the apparatus further to:

receive a restricted subset of Discrete Fourier Transform components, wherein the subset comprises a window of contiguous components or a set of non-contiguous components of a Discrete Fourier Transform codebook including at least component 0.

* * * * *